Figure 1A:
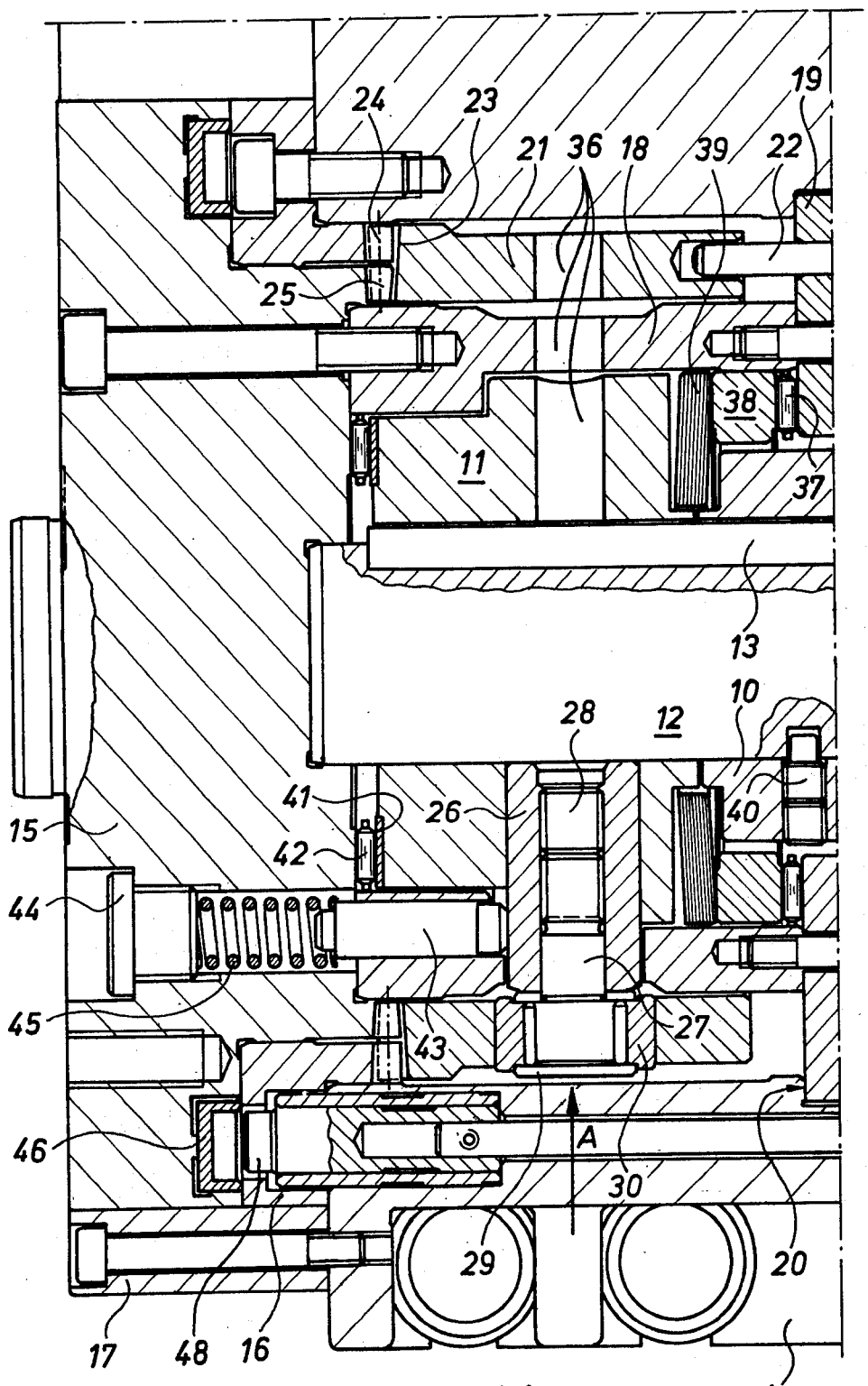

United States Patent [19]

Kettel

[11] Patent Number: 4,467,680
[45] Date of Patent: Aug. 28, 1984

[54] TOOL TURRET WITH REVOLVING HEAD

[75] Inventor: Hans Kettel, Riederich, Fed. Rep. of Germany

[73] Assignee: Sauter Feinmechanik GmbH, Metzingen, Fed. Rep. of Germany

[21] Appl. No.: 413,662

[22] Filed: Sep. 1, 1982

[30] Foreign Application Priority Data

Sep. 4, 1981 [DE] Fed. Rep. of Germany ....... 3134969

[51] Int. Cl.³ .............................................. B23B 29/32
[52] U.S. Cl. ................................... 82/36 A; 74/813 L
[58] Field of Search .............. 82/36 A; 74/813 L, 826

[56] References Cited

U.S. PATENT DOCUMENTS 3,718,055 2/1973 Maier ................................. 74/813 L
4,015,487 4/1977 Pfister ................................. 74/813 L Primary Examiner—Leonidas Vlachos
Attorney, Agent, or Firm—Walter C. Farley

[57] ABSTRACT

A tool turret has a housing and a revolving head which can be fixed in different rotational positions by means of an arrangement of toothed rings. A locking device includes a cam drive for the selective releasing and fixing in position of the gear teeth. In order to configure the tool turret simply and to save space, an axially movable, annular locking part is provided with axial gear teeth and has one part of the cam drive in the form of a curvilinear aperture. The middle sections of the curvilinear aperture are straight and side parts extend obliquely. A guide member penetrates the curvilinear aperture as the other part of the cam drive. The teeth cooperating with the teeth on the locking part are mounted on the revolving head and on a stationary toothed ring.

5 Claims, 3 Drawing Figures

TOOL TURRET WITH REVOLVING HEAD

This invention relates to a rotatable tool turret of the type having a housing, a rotatable head for carrying a tool, the head and housing having coaxial rotatable and fixed toothed rings, respectively, and locking apparatus for engaging the teeth of the rings to selectively release and fix the position of the head at any of a plurality of positions.

BACKGROUND OF THE INVENTION

In a known tool turret of the type to which the invention relates, an example of which is shown in German Pat. No. 16 27 051, a cam drive is provided for disengaging facing gear teeth, and another cam drive is provided for engaging the facing teeth. In this apparatus, the rotating head must be lifted out during the disengagement of the teeth and reinserted for reengagement thereof, so that the teeth will mesh again. The cam drive for disengaging the teeth includes an axial cam which works on the rotating head through a lug and a multiple-disc brake which creates the danger of force being applied excessively to one side. The cam drive for engaging of the teeth includes a radial cam which acts on gear teeth through a toggle lever mounted on the rotating head. This apparatus for selectively engaging and disengaging the facing teeth is very costly and occupies a considerable amount of space.

In another known tool turret shown in German Auslegeschrift No. 28 49 167, the cam drive has a member with an annular groove into which fits a guide member which is attached to a lever. A control element which rotatably supports the member with the annular groove in it is mounted on an axis parallel with the axis of the rotating head. The axis of the rotating head passes through the annular lever which acts on its shaft by means of a toggle lever coupling against the force of a spring when the gear teeth arrangement is to be engaged. This embodiment of the tool turret requires two shafts arranged side-by-side and, therefore, also uses much space and is expensive.

A multiple tool holder for machine tools having an annular locking part is also known, an embodiment of this being shown in German Offenlegungeschrift No. 27 41 907 and U.S. Pat. No. 4,202,227. This locking apparatus has a locking part with teeth on a facing side and axial cams on its other facing side by which the locking part can be axially forced against the bias of a spring. The other teeth of the facing teeth cooperating with those mounted on the locking part, and belonging to the facing gear teeth, are mounted on the rotating head and on a stationary part coaxial therewith. The facing cams on the locking part and on the stationary part of the multiple tool holder are permanently under spring bias, which creates increased frictional resistance.

BRIEF DESCRIPTION OF THE INVENTION

An object of the present invention is to provide a tool turret which is simple, occupies little space, and can be economically constructed.

Briefly described, the invention includes a rotatable tool turret of the type having a housing, a rotatable head for carrying a tool, the head and housing having coaxial rotatable and fixed toothed rings, respectively, and locking apparatus for engaging the teeth of the rings to selectively release and fix the position of the head at any of a plurality of positions, wherein the locking apparatus comprises an annular axially movable locking member having at one end thereof axially facing teeth directed toward and engageable concurrently with the teeth on the rotatable and fixed rings; and a cam drive for controlling the axial movement of said locking member comprising means on said locking member defining a cam surface aperture with a central portion having substantially straight portions lying in planes perpendicular to the axis of said member and with side portions extending obliquely toward the toothed end of said member, a control member coaxial with said locking member and axially fixed relative to said rotatable and fixed toothed rings, and a guide member extending radially from said control member into said aperture, said guide member being angularly movable relative to said locking member, causing said guide member to engage said oblique portions of said aperture to move said locking member away from the tooth-engaging position thereof.

The cost of constructing a tooth turret in accordance with the invention is very low. The construction facilitates rapid and exact adjustment even with a large load. The arrangement of the curvilinear aperture in a part coaxial to the axis of the revolving head, the use of an annular locking part which is also coaxial with the revolving head and which carries the teeth which face on one side of the lockable teeth, and the lockable teeth themselves which are disposed in two coaxial rings, one of the rings being carried by the rotatable head and the other ring being stationary, both rings overlapped by the teeth carried by the locking part, make space-saving construction possible, partly because of the omission of a shaft parallel to the axis of the revolving head. The guide member is always in the annular groove and therefore properly guides the components.

Other features of the invention permit the teeth lying opposite each other to mesh precisely without excessive axial stress on the teeth.

An energy saving aspect of the turret is provided by the action of the spring which is only effective when the teeth are meshed together, there being no axial force when the teeth are not meshed.

Figures 1B, 2:
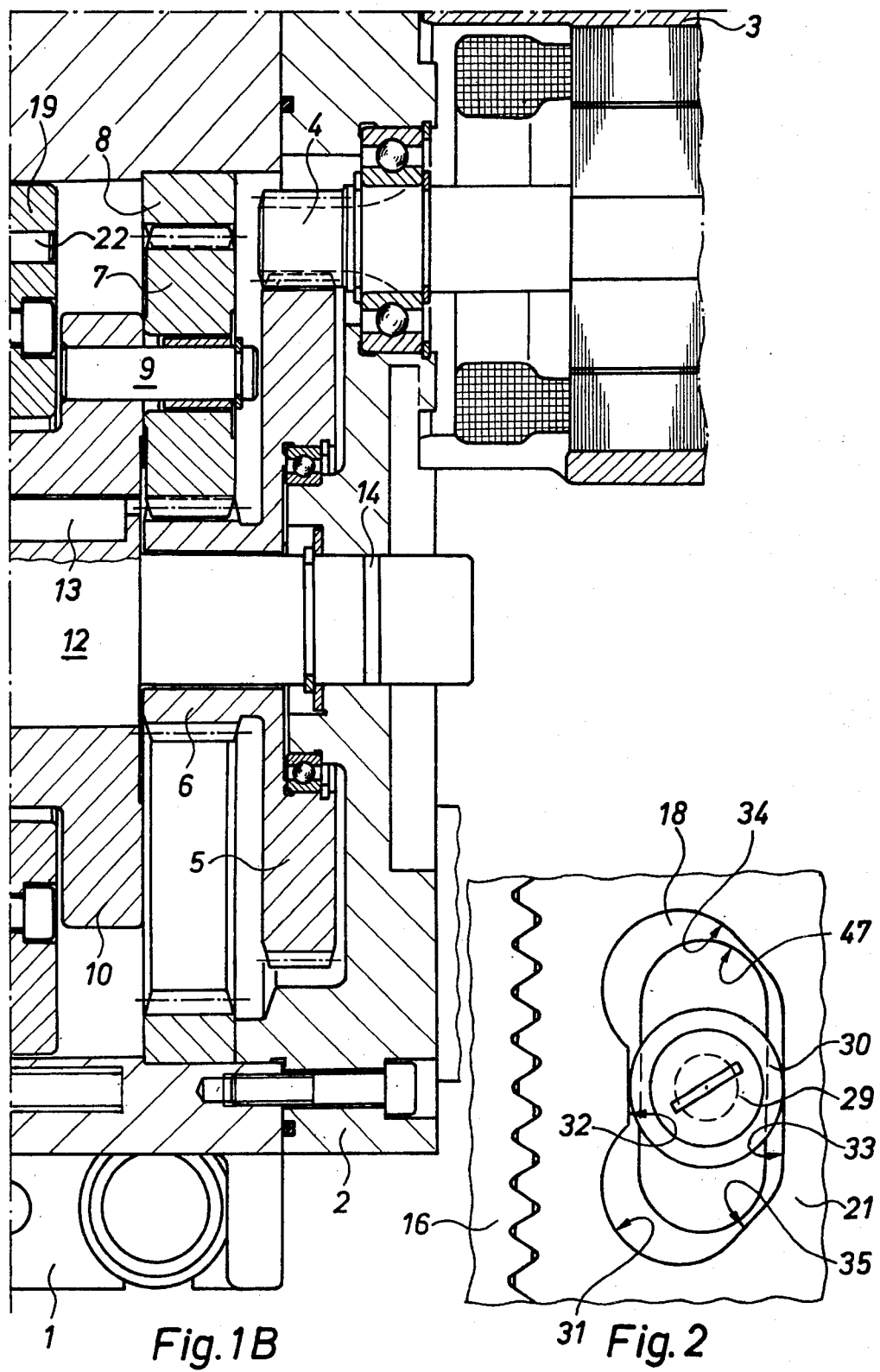

In order that the manner in which the foregoing and other objects are attained in accordance with the invention can be understood in detail, a particularly advantageous embodiment of the invention will be described with reference to the accompanying drawings, which form a part of this specification, and wherein:

FIGS. 1A and 1B are separated portions of a longitudinal cross section through a rotatable turret in accordance with the present invention; and FIG. 2 is a fragmentary view of a portion of the apparatus of FIG. 1A in the direction of the arrow A.

Referring first to FIGS. 1A and 1B, the apparatus of the invention includes a housing 1 which can be mounted on a machine tool, not shown. Housing 1 is closed on the right side in the drawing (FIG. 1B) by a housing cover 2. A drive motor 3 surrounded by a housing, not shown, is drivable in both directions and the housing thereof is coupled to housing cover 2. A drive pinion 4 is mounted on the drive shaft of motor 3 and projects into housing cover 2 where it drives a gear wheel 5 which is rotatably mounted on a projection formed on the inner surface of housing cover 2. Gear 5 is unitarily formed with a pinion 6 of smaller diameter which meshes with a planet wheel 7 of a planetary gearing assembly. The teeth of planet wheel 7 mesh with the inside teeth of a stationary sun wheel 8 which is non-rotatably connected to housing 1. In planet wheel 7 is journaled an axial pin 9 which eccentrically penetrates a drive gear 10.

A control element 11 is arranged coaxially with drive gear 10. A shaft 12 extends through drive gear 10 and control element 11, and is connected non-rotatably with them by means of a key insert 13 which in a slot in shaft 12 and mating slots in elements 10 and 11. An offset portion of shaft 12 passes through pinion 6 with some clearance and is rotatably supported in housing cover 2 (FIG. 1B). The clearance between housing cover 2 and shaft 12 is packed by a gasket 14. As shown on the left side of FIG. 1A, shaft 12 projects into a rotating head 15 which has an annular recess engaging a ring 16 which thereby radially guides head 15 and prevents axial movement thereof to the right. The inner annular surface of ring 16 is provided with a set of radially extending, axially protruding teeth. An annular housing 17 surrounds head 15. Both of rings 16 and 17 are attached to housing 1 by screws. It will be observed that shaft 12 and rotating head 15 can be rotated independently of each other.

Control element 11 is surrounded with some clearance by a hollow cylindrical connection element 18 which is connected at one end by screws to revolving head 15 and also is connected by means of screws to a ring bearing 19 at the other end. Ring bearing 19 axially abuts a shoulder 20 of housing 1. The axial bearing of rotatable head 15 on the axially facing surface of toothed ring 16 and the axial support of ring bearing 19 on housing 1 prevents axial movement of head 15 relative to housing 1.

Connection element 18 is surrounded with some clearance by a hollow cylindrical locking member 21 which is axially movable and is rotatably coupled by a lug 22 to ring bearing 19. Lug 22 extends into locking member 21 with some clearance, lug 22 being parallel to the axis of shaft 12. Locking member 21 has axially extending teeth 23 on the annular surface thereof which faces toward rotatably head 15. Axial teeth 24 and 25, cooperating with teeth 23, are thus arranged on toothed ring 16 and head 15. Head 15 and ring 16 are capable of being fixedly interconnected because axial teeth 24 and 25 lie in substantially the same plane and the teeth thereof can be radially aligned with each other. When locking member 21 is in the position shown in FIG. 1A, axial teeth 23 concurrently mesh with axial teeth 24 and 25 and thereby prevent rotation of head 15 around its axis relative to ring 16.

Control element 11 supports three radially extending bushings 26 which extend outwardly and are separated by equal sector angles. A journal pin 27 projecting radially outwardly is screwed into each of these bushings wherein it is held by means of a counterscrew 28 in the vicinity of shaft 12. Journal pin 27 supports a roller 30 between its radially outwardly projecting flange 29 and bushing 26. Roller 30 passes through locking part 21 and bushing 26 passes through connection element 18 (FIG. 2). Bushing 26 passes through a circularly elongated aperture 47 in connection element 18 and roller 30 is within a curvilinear aperture 31 in locking element 21. The aperture 31 has two sections 32 and 33 which, when radially viewed as in FIG. 2, appear to be substantially straight, but which, of course, curve with the annular body. Thus, it can be said that these two surfaces lie in parallel planes perpendicular to the axis of shaft 12. At the opposite ends of these straight sections are inclined or oblique surfaces 34 and 35 which, as illustrated in FIG. 2, make an angle of approximately 45° with surfaces 32 and 33. Curvilinear aperture 31 permits axial movement of locking part 21 corresponding to the meshing of its axial teeth with the opposed axial teeth 24, 25, and permits the disengagement of these teeth which, in turn, permits rotating head 15 to be swiveled about its axis by means of drive motor 3. Aperture 31 is configured to correspond to the movement of bushing 26 relative to element 18. A radial assembly bore 36 is provided in the bisecting angle between each two bushings 26 in control element 11. Corresponding assembly bores are also found in connection element 18 and locking member 21.

Ring bearing 19, which is connected through connection element 18 with head 15, is a component of an axial bearing with roller bearings 37 and a spacing ring 38 on the opposite side of the roller bearings. Between spacing ring 38 and control element 11 is a set of cup springs 39.

The axial position of drive gear 10 relative to shaft 12 is fixed by means of a radial screw 40 which is threaded into drive gear 10 and extends into shaft 12. Control element 11 supports a bearing disc 41 on its end facing toward head 15. Between disc 41 and head 15 is a needle bearing assembly 42 serving as an axial bearing.

An axially movable bolt 43, which extends axially parallel with shaft 12 in head 15, is associated with each bushing 26. Between each bushing 26 and a screw 44 threaded into head 15 is clamped a compression coil spring 45 which urges its associated bolt 43 in the direction of bushing 26. The end of bolt 43 adjacent busing 26 is formed in a frustoconical shape so that the bolt prevents displacement of head 15 when the head is in a horizontal position.

A preforated ring 46 with holes having axes parallel to the axis of shaft 12 is provided to engage with a positioning bolt 48, ring 46 being mounted in head 15. One or both of perforated ring 46 and bolt 48 are suitably flexible for this purpose.

Drive motor 3 drives the gear 10 through planetary gear train 6–9 which carries control element 11 through insert 13 and shaft 12, whereupon bushing 26 and roller 30, respectively, are moved out of their middle positions in apertures 31 and 47 into the side position. With the movement of roller 30 within curvilinear aperture 31 into the side position it runs along curvilinear section 34 or 35 and locking part 21 is moved axially in the direction away from ring 16 and teeth 24, 25 so that teeth 23 no longer mesh with teeth 24, 25. Connection element 18 and, thus, head 15 are carried along by engagement of bushing 26 with the end of elongated aperture 47. When the head has passed through the desired rotational angle, the indexing bolt 48 meshes in one of the holes 46 and drive motor 3 is reversed, whereupon bushing 26 and roller 30 return to their middle positions as illustrated in FIG. 2 in apertures 31 and 47, respectively. When roller 30 returns to its middle position, it rests against straight section 32, whereupon locking part 27 is moved axially so that its teeth 23 again mesh with axial teeth 24 and 25 for the exact coordination of the pivot position of head 15 and also to hold this pivot position. Drive motor 3 is adjusted promptly, by means not shown, such as a limit switch, so that bushing 26 and roller 30 do not by-pass their middle position shown in FIG. 2.

The axial dimensions of ring bearing 38, which is supported on roller 37, and of control element 11, bushing 26, trunnion 27, roller 30 and section 32 of aperture 31 allow cup spring 39 to be primarily effective when axial teeth 23 of locking element 21 mesh with teeth 24 and 25. However, it is preferred that cup springs 39 are under axial stress when roller 30 runs out into one of the curvilinear sections 34, 35 of aperture 31. The precise adjustment of this relationship can be attained by suitable selection of the thickness of spacing ring 38.

It will be recognized that head 15 can also be rotated in the opposite direction. For this, then, drive motor 3 runs in the opposite direction from that assumed in the above sequence.

The described structure is not expensive to manufacture and needs only small space. Curvilinear aperture 31, as distinguished from customary axial curves for the movement of a locking part, has the advantage of safe operation since, with such an axial curve, despite theoretical automatic locking, in practice there has been no assurance of such locking.

While one advantageous embodiment has been chosen to illustrate the invention, it will be understood by those skilled in the art that various changes and modifications can be made therein without departing from the scope of the invention as defined by the appended claims.

What is claimed is:

1. A rotatable tool turret of the type having a housing, a rotatable head for carrying a tool, the head and housing having coaxial rotatable and fixed toothed rings, respectively, and locking apparatus for engaging the teeth of the rings to selectively release and fix the position of the head at any of a plurality of positions, wherein the locking apparatus comprises an annular axially movable locking member having at one end thereof axially facing teeth directed toward and engageable concurrently with the teeth on the rotatable and fixed rings; and a cam drive for controlling the axial movement of said locking member comprising means on said locking member defining an elongated cam surface aperture with a central portion having substantially straight portions lying in planes perpendicular to the axis of said member and with side portions extending obliquely toward the toothed end of said member, a control member coaxial with said locking member, means for axially limiting the movement of said control member relative to said rotatable and fixed toothed rings, a guide member extending radially from said control member into said aperture, and means for angularly moving said guide member relative to said locking member, causing said guide member to engage said oblique portions of said aperture to move said locking member away from the tooth-engaging position thereof.

2. A turret according to claim 1 and including
an annular element axially coupled to and spaced from said rotatable head; and
an axially urging spring clamped between said annular element and said control member.

3. A turret according to claim 2, wherein said spring and said cam drive are matched such that said spring acts on said toothed members only when said teeth are meshed.

4. A turret according to claim 3 wherein said annular element includes a spacing ring for controlling the action of said spring.

5. A rotatable tool turret of the type having a housing, a rotatable head for carrying a tool, the head and housing having coaxial rotatable and fixed toothed rings, respectively, and a locking apparatus for engaging the teeth of the rings to selectively release and fix the position of the head at any of a plurality of positions, wherein the locking apparatus comprises an annular axially movable locking member having at one end thereof axially facing teeth directed toward and engageable concurrently with the teeth on the rotatable and fixed rings;

cam means for controlling the axial movement of said locking member including a cam aperture in said locking member and a guide member connected to said head and engaging said aperture, said cam aperture being driven and having peripherally extending central cam surface portions and obliquely extending end cam surface portions; and means for angularly moving said guide member relative to said aperture.

* * * * *